United States Patent Office 2,813,825
Patented Nov. 19, 1957

2,813,825

METHOD OF PRODUCING PERCHLORATES

Henry C. Miller, Hatfield Township, Montgomery County, and John C. Grigger, Springfield Township, Montgomery County, Pa., assignors to Pennsalt Chemicals Corporation, a corporation of Pennsylvania No Drawing. Application December 14, 1955,
Serial No. 552,966

14 Claims. (Cl. 204—82)

The present invention relates to a novel method for electrolytically producing perchlorates; and, more particularly, the present invention relates to a novel method for electrolytically oxidizing a chlorate in aqueous solution to the corresponding perchlorate by which improved current efficiencies during operation of the cell are realized.

It has long been known that aqueous solutions of chlorate, such as the alkali metal chlorates, can be electrolyzed to form the corresponding perchlorates in solution. The literature on the electrolytic production of perchlorates indicates a unanimous acceptance of platinum is the most favored anode material. In spite of the high capital investment involved and the significant replacement costs due to electrochmeical attack and mechanical disintegration, platinum is still used as an anode in the major perchlorate installations. The search for a platinum substitute for perchlorate manufacture has proceeded for many years with the result that other materials have been suggested for use as anode including graphite, silicon, manganese dioxide, magnetite and lead dioxide. In copending applications Serial Nos. 552,968 and 552,970, filed December 14, 1955, are disclosed and claimed particularly advantageous electrodes comprising lead dioxide which are particularly suitable for use in perchlorate cells.

As is known, in the electrolysis of chlorate to perchlorate there is a drop in current efficiency in the cell as the concentration of chlorate in the electrolyte decreases. The exact drop, and the concentration level at which it begins to take noticeable effect, varies with the particular anode employed. For example, in electrolyzing sodium chlorate to perchlorate employing a platinum anode, the overall current efficiency is generally maintained at a high value in the neighborhood of 80% as the sodium chlorate is electrolyzed from about 600 grams per liter down to as low as about 3 grams per liter; however, there is a substantial drop in current efficiency in the sodium chlorate concentration range below about 100 grams per liter. In a cell with a lead dioxide anode, the current efficiency begins to fall even at the initially high sodium chlorate concentrations, and although an average current efficiency of about 68% has been obtained in the sodium chlorate concentration range of about 600 to about 100 grams per liter, the current efficiency usually drops to below 10% in the sodium chlorate concentration range below 100 grams per liter.

It has previously been suggested to employ additives in an attempt to increase current efficiency in the perchlorate cell. Present day commercial cells using platinum anodes generally employ an electrolyte containing initially about 600 grams per liter of chlorate, usually sodium chlorate, and 5 grams per liter of a soluble dichromate, usually sodium dichromate. There has also been a suggestion to add a small amount of sodium fluoride to increase the current efficiency of a cell employing a lead dioxide anode.

It has been found, however, that there are definite limitations to the use of such additives. Using a lead dioxide anode, for example, and sodium fluoride as the additive, 2.5 grams per liter of soduim fluoride increased the overall current efficiency appreciably on the first batch electrolysis; however, this current efficiency steadily dropped on three succeeding electrolysis to below the value obtained before the sodium fluoride addition. The presence of sodium dichromate at concentrations as low as 0.5 grams per liter (as the dihydrate) sharply decreased the current efficiency of the chlorate to perchlorate electrolysis when operating with a lead dioxide anode. Other materials, including sodium thiocyanate, platinum chloride, sodium hexametaphosphate, sodium pyrophosphate, sodium perborate, sulfuric acid and hydrogen peroxide have also been tried resulting either in no apprecibale beneficial effect or actual reduction in cell current efficiency.

It is the principal object of the present invention to provide an improved method for electrolytically producing perchlorates.

It is another object of the present invention to provide a method for electrolytically oxidizing a chlorate in aqueous solution to perchlorate by which process improved cell current efficiencies are realized.

A further object of the present invention is to provide a method by which the foregoing objects are realized through the agency of the simple addition of an additive to the electrolyte.

Other objects will become apparent from a consideration of the following specification and the claims.

It has been found that the inclusion of a water-soluble persulphate in the chlorate-containing electrolyte significantly increases the cell current efficiency during electrolysis. Accordingly, the process of the present invention comprises, in the electrolytic production of perchlorate involving the electrolytic oxidation of chlorate in aqueous solution to perchlorate, the improvement comprising conducting at least a portion of such electrolysis with a small amount of a water-soluble persulphate dissolved in said electrolyte.

The present invention, as stated, relates to an improvement in the conventional electrolytic oxidation of chlorate to perchlorate, and, thus, as far as the concentration and nature of chlorate, nature of electrodes, temperature and other conditions are concerned, these may be as heretofore employed in the perchlorate system although, as pointed out later on herein, the present improvement may be more marked with the use of certain electrode materials than with others. As far as the nature of the chlorate is concerned, the type of chlorate selected will determine the type of perchlorate produced in the cell as the direct result of electrolysis. Since the alkali metal perchlorates are presently the most common perchlorates produced by this method, the chlorate employed in the initial electrolyte will normally be an alkali metal chlorate. The chlorate employed will, as stated, correspond to the perchlorate produced directly in the cell; however, it need not correspond to the perchlorate ultimately desired. For example, in the preparation of potassium perchlorate, common practice is to electrolyze sodium chlorate to form sodium perchlorate, followed by conversion of the sodium perchlorate to potassium perchlorate by reaction with potassium chloride.

At the initiation of electrolysis it is generally desired to have a concentration of chlorate in the electrolyte as high as feasible under the temperature conditions obtaining, since the higher the concentration the more efficient the process. In most cases this initial concentration of chlorate is in the neighborhood of 500–700 grams per liter. Of course, as electrolysis proceeds, the concentration of chlorate as such in the electrolyte diminishes until a point is reached, usually in the neighborhood of 2–10 grams of chlorate per liter, where further electrolysis becomes impractical.

The temperature at which the perchlorate cell is operated may vary widely, and the temperature of the bath may vary from room temperature up to elevated temperatures as high as about 70° C. Preferred practice is to maintain the temperature of the bath between about 25 and about 55° C.

As is usual in the electrolytic oxidation of chlorate to perchlorate, agitation of the electrolyte bath is desirable, and circulation of the electrolyte bath through one or more cells is preferred practice.

The electrolysis of the chlorate is generally carried out at a pH below about 9, and preferably at a non-alkaline, that is a neutral or acid, pH. Generally, an acid pH is preferred when the cell is to be operated at an elevated temperature.

With respect to the electrical conditions employed, in general current yields improve with increase in current density. In addition, higher anode current densities tend to minimize the adverse effects of operation at higher temperatures, of gradual depletion of chlorate in electrolyte bath and of competing anode reactions. In the preferred practice of the present process, anode current densities of at least about 20 amperes per square decimeter, preferably at least about 40 amperes per square decimeter, are employed.

Any of the usual anode materials heretofore used or suggested may be employed in accordance with the present process, including platinum, manganese dioxide, graphite, magnetite, lead dioxide, silicon, and the like. The use of lead dioxide anodes is particularly advantageous, especially those forming the subject matter of copending applications Serial Nos. 552,968 and 552,970, referred to hereinabove. The anode material of copending application Serial No. 552,970 comprises a tantalum body having a coating of lead dioxide electrodeposited thereon. The anode material of copending application Serial No. 552,968 comprises a metal body presenting a large surface area relative to its mass, such as a wire, screen, or other foraminous sheet, having a coating of lead dioxide electrodeposited thereon. In each of these anodes the thickness of the lead dioxide deposit is preferably at least about $\frac{1}{16}$ inch. The most marked improvement in current efficiency through the use of a persulphate in accordance with the present invention is noted with lead dioxide anodes. However, the improvements in current efficiencies may also be realized when any of the other anode materials are employed.

A cathode is also provided in the present system, and the cathode employed may be any of those materials conventionally used in the perchlorate process, such as stainless steel.

In accordance with the present invention, there is included in the chlorate-containing electrolyte a small amount of a water soluble persulphate. Since potassium persulphate is the most readily available it is generally preferred. However, any water soluble persulphate may be used, such as the other alkali metal persulphates.

The amount of persulphate employed may vary somewhat. Amounts in excess of about 10 grams per liter provide no significant improvement over the inclusion of lesser amounts, whereas amounts less than about 1 gram per liter do not provide any marked improvement. Preferably, the amount employed is between about 2 and about 5 grams per liter.

The greatest drop in current efficiency in the perchlorate cell often occurs at chlorate concentration levels below the high initial chlorate concentration. Hence, significant improvements in the overall cell current efficiency may be realized by adding the persulphate after electrolysis has been started and when the concentration of chlorate has dropped to a point where cell current efficiencies begin to decrease appreciably. Thus, in accordance with the broader aspects of the present invention, the persulphate will be present during at least the latter portion of electrolysis, for example, during at least that portion when the concentration of chlorate is less than about 100 grams per liter. Preferably, however, the persulphate is present during at least that portion of the process wherein the concentration of chlorate is below about 200 to 300 grams per liter, and in accordance with particularly preferred practice, the persulphate is present from substantially the start of electrolysis.

In carrying out the process of the present invention, the anode and the cathode will be immersed in the stated chlorate-containing electrolyte bath and the circuit will be completed to cause electrolytic oxidation of the chlorate. Electrolysis is continued until the desired amount of chlorate is converted to perchlorate which means, in general, that electrolysis is continued until the concentration of chlorate has been reduced to the point where further electrolysis becomes impractical. As pointed out previously, this is generally in the neighborhood of about 10 grams per liter of chlorate or less. If the persulphate is not present in the electrolyte at the initiation of electrolysis, it may be added at any desired time as discussed above.

The present invention will be more readily understood from a consideration of the following specific examples which are given for the purpose of illustration only and are not intended to limit the scope of the invention in any way.

*Example I*

To an aqueous solution containing 606 grams per liter of sodium chlorate is added potassium persulphate in an amount of 2.08 grams per liter. The resulting solution is electrolyzed using a lead dioxide anode and a stainless steel cathode at 30 amperes per square decimeter and at a temperature of 35° C. In the sodium chlorate concentration range of 606 to 100 grams per liter, the current efficiency is 82.4% and in the range of 606 to 7.1 grams per liter of sodium chlorate, the current efficiency is 73.3%.

*Example II*

In a second run employing the anode and cathode, similar electrolyte system and operating conditions of Example I, the current efficiency is 80.8% in the sodium chlorate concentration of 606 to 100 grams per liter, and 68.2% in the chlorate range of 606 to 30.3 grams per liter.

Considerable modification is possible in the selection of anode, cathode, electrolyte bath concentration and constitution and in the operating conditions, without departing from the scope of the present invention.

We claim:

1. In the electrolytic production of perchlorate involving the electrolytic oxidation of chlorate in aqueous solution to perchlorate, the improvement which comprises conducting at least a portion of the electrolysis with at least about 1 gram per liter of a persulphate dissolved in the chlorate-containing electrolyte bath.

2. In the electrolytic production of perchlorate involving the electrolytic oxidation of chlorate in aqueous solution to perchlorate, the improvement which comprises conducting at least the latter portion of the electrolysis with at least about 1 gram per liter of a persulphate dissolved in the chlorate-containing electrolyte bath.

3. In the electrolytic production of perchlorate involving the electrolytic oxidation of chlorate in aqueous solution to perchlorate the improvement which comprises conducting at least the latter portion of the electrolysis at a temperature between room temperature and about 70° C. with at least about 1 gram per liter of a persulphate dissolved in the chlorate-containing electrolyte bath.

4. The method of claim 3 wherein electrolysis is conducted at a temperature between about 25 and about 55° C.

5. In the electrolytic production of perchlorate involving the electrolytic oxidation of chlorate in aqueous solution to perchlorate, the improvement which comprises conducting at least the latter portion of the electrolysis with between about 1 and about 10 grams of a persulphate per liter dissolved in the chlorate-containing electrolyte bath.

6. The method of claim 5 wherein there are between about 2 and about 5 grams of a persulphate per liter dissolved in the chlorate-containing electrolyte bath.

7. In the electrolytic production of an alkali metal perchlorate involving the electrolytic oxidation of an alkali metal chlorate in aqueous solution to perchlorate, the improvement which comprises conducting at least the latter portion of the electrolysis with at least about 1 gram per liter of an alkali metal persulphate dissolved in the chlorate-containing electrolyte bath.

8. In the electrolytic production of sodium perchlorate involving the electrolytic oxidation of sodium chlorate in aqueous solution to sodium perchlorate, the improvement which comprises conducting at least the latter portion of the electrolysis with at least about 1 gram per liter of an alkali metal persulphate dissolved in the chlorate-containing bath.

9. The method of claim 8 wherein the temperature is between about room temperature and about 70° C., and wherein there are between about 1 and about 10 grams of potassium persulphate per liter dissolved in the chlorate-containing electrolyte bath.

10. In the electrolytic production of potassium perchlorate involving the electrolytic oxidation of sodium chlorate in aqueous solution to sodium perchlorate and the conversion of said sodium perchlorate to potassium perchlorate, the improvement which comprises conducting at least the latter portion of the electrolysis with between about 1 and about 10 grams of potassium persulphate per liter dissolved in the chlorate-containing electrolyte bath.

11. The method of claim 1 wherein an anode comprising material selected from the group consisting of graphite, silicon, manganese dioxide, magnetite and lead dioxide is employed during the electrolysis.

12. The method of claim 1 wherein an anode comprising lead dioxide is employed during the electrolysis.

13. The method of claim 7 wherein an anode comprising a material selected from the group consisting of graphite, silicon, manganese dioxide, magnetite and lead dioxide is employed during the electrolysis.

14. The method of claim 7 wherein an anode comprising lead dioxide is employed during the electrolysis.

References Cited in the file of this patent

UNITED STATES PATENTS 2,512,973    Schumacher _____ June 27, 1950

OTHER REFERENCES

Glasstone: Electrolytic Oxidation and Reduction (1936), publ. by Van Nostrand Co. Inc., New York, pp. 375-378 cited.